Patented Feb. 25, 1941

2,233,375

UNITED STATES PATENT OFFICE 2,233,375

MANUFACTURE OF VITAMIN A

Richard Kuhn, Heidelberg, Germany, and Colin J. O. R. Morris, London, England, assignors to Winthrop Chemical Company, Inc., New York, N. Y., a corporation of New York No Drawing. Application March 23, 1938, Serial No. 197,613. In Germany March 27, 1937

7 Claims. (Cl. 260—617)

This invention relates to a process for the manufacture of synthetic vitamin A.

The synthesis of the vitamin A has so far not been successful, though the constitution of the vitamin has been known for some years.

In accordance with the present invention it is possible to obtain the vitamin A and its homologues synthetically. The process of manufacture of the invention consists in condensing β-ionylidene-acetaldehyde (compare copending application of even date) in the presence of salts of secondary amines with crotonaldehyde or its higher homologues to ε-(β-ionylidene)-sorbinaldehyde or its homologues and reducing the aldehyde group in the aldehyde compounds obtained in this manner to the alcohol group by means of mild reducing agents, for instance according to the methods of Meerwein and Ponndorf, while retaining the double bond. Salts of secondary amines which are particularly suitable for the condensation are the salts of piperidine, for instance piperidine acetate. For the reduction particularly aluminium alcoholates, especially the aluminates of secondary alcohols, such as isopropyl alcohol, have proved suitable. When β-methylcrotonaldehyde is used in the condensation a compound is obtained on reducing the condensation product, which corresponds in all its properties with the vitamin A obtained from natural substances. The reaction performs in this case according to the following reaction scheme:

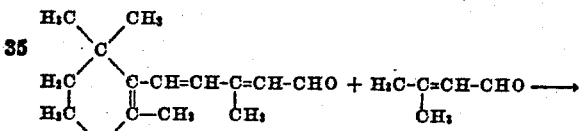

β-Ionylidene-acetaldehyde

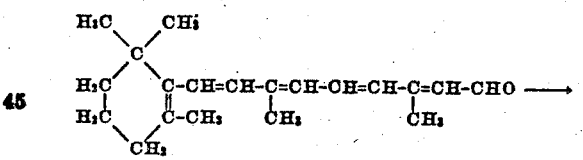

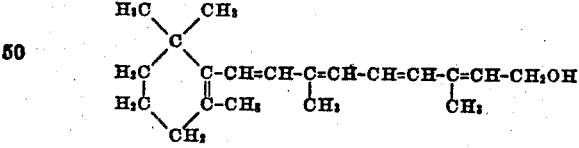

Vitamin A

It is advisable to perform the process in the absence of oxygen.

The invention is illustrated by the following example without being limited thereto:

Example 3.9 grams of β-ionylidene-acetaldehyde are added to a mixture of 0.05 gram of piperidine, 0.05 gram of glacial acetic acid and 0.05 cc. of alcohol. In an atmosphere of pure nitrogen 1.5 gram of β-methylcrotonaldehyde are added drop by drop during one hour. The reaction mixture assumes a dark brown coloration. After standing for several hours at ordinary temperature the mixture is diluted with ether, the piperidine washed out with very dilute hydrochloric acid, the ethereal solution is then shaken with dilute sodium carbonate solution and water and dried in a nitrogen atmosphere over sodium sulphate. The solution yields a deep blue-green coloration with antimony trichloride in chloroform. The ethereal solution of the five-times unsaturated aldehyde is evaporated in a nitrogen atmosphere and the residue dissolved in 55 ccs. of isopropyl alcohol (freshly distilled over aluminium). At a bath temperature of 110° C. 2 grams of aluminium isopropylate are added in a nitrogen atmosphere. The temperature is then elevated to 120° C. so that the isopropyl alcohol distils off. About 30 ccs. of isopropyl alcohol are added three times until the distilled alcohol does not give an acetone reaction with para-nitrophenylhydrazine in glacial acetic acid (after about ¾ of an hour). The cooled reaction mixture is then diluted with petroleum ether (boiling at 30-40° C.) and extracted with 2 normal phosphorus acid solution. The aqueous layer is further extracted twice with petroleum ether. The combined petroleum ether solutions are repeatedly washed with water and dried over sodium sulphate. This solution yields with antimony trichloride in chloroform a deep blue coloration (absorption band 606$m\mu$). By chromatographic adsorption, if desired repeated, on aluminium oxide from benzine and elutriation with benzene-benzine whereby the vitamin in every case is present in the highest layer, a pure product is obtained which shows the same properties as the vitamin A obtained from natural substances. 1 γ of the synthetic product has proved to be highly efficacious in daily administration to rats when tested in accordance with the usual standardization method.

We claim:

1. The process which comprises condensing β-ionylidene-acetaldehyde in the presence of a salt of a secondary amine with β-methyl-crotonaldehyde to ε-(β-ionylidene)-β-methyl-sorbinaldehyde and reducing the aldehyde group of the latter compound to the alcohol group by means of an aluminate of a secondary alcohol.

2. The process which comprises condensing β-ionylidene-acetaldehyde in the presence of piperidine acetate with β-methyl-crotonaldehyde to ε-(β-ionylidene)-β-methyl-sorbinaldehyde and reducing the aldehyde group of the latter compound to the alcohol group by means of an aluminate of a secondary alcohol.

3. The process which comprises condensing in the absence of oxygen β-ionylidene-acetaldehyde in the presence of a salt of a secondary amine with β-methyl-crotonaldehyde to ε-(β-ionylidene)-β-methyl-sorbinaldehyde and reducing the aldehyde group of the latter compound to the alcohol group by means of an aluminate of a secondary alcohol.

4. The process which comprises condensing in the absence of oxygen β-ionylidene-acetaldehyde in the presence of piperidine acetate with β-methyl-crotonaldehyde to ε-(β-ionylidene)-β-methyl-sorbinaldehyde and reducing the aldehyde group of the latter compound to the alcohol group by means of an aluminate of a secondary alcohol.

5. The process which comprises condensing β-ionylidene-acetaldehyde in the presence of a salt of a secondary amine with β-methyl-crotonaldehyde to ε-(β-ionylidene)-β-methyl-sorbinaldehyde and reducing the aldehyde group of the latter compound to the alcohol group by means of aluminium isopropylate.

6. The process which comprises condensing β-ionylidene-acetaldehyde in the presence of piperidine acetate with β-methyl-crotonaldehyde to ε-(β-ionylidene)-β-methyl-sorbinaldehyde and reducing the aldehyde group of the latter compound to the alcohol group by means of aluminium isopropylate.

7. The process which comprises condensing in the absence of oxygen β-ionylidene-acetaldehyde in the presence of piperidine acetate with β-methyl-crotonaldehyde to ε-(β-ionylidene)-β-methyl-sorbinaldehyde and reducing the aldehyde group of the latter compound to the alcohol group by means of aluminium isopropylate.

RICHARD KUHN.
COLIN J. O. R. MORRIS.